United States Patent [19]
Yontrarak

[11] Patent Number: 4,731,140
[45] Date of Patent: Mar. 15, 1988

[54] WOODEN TILE AND A METHOD OF MAKING THE SAME

[76] Inventor: Bunlue Yontrarak, 86, Suksawas Road, T. Laemfepha A. Muang, C. Samutorakarn, Thailand

[21] Appl. No.: 745,678

[22] Filed: Jun. 17, 1985

Related U.S. Application Data

[63] Continuation of Ser. No. 663,819, Oct. 22, 1984, abandoned, which is a continuation of Ser. No. 315,083, Oct. 26, 1981, abandoned. This application Jun. 17, 1985, Ser. No. 745,678.

[51] Int. Cl.[4] .............................................. B32B 31/00
[52] U.S. Cl. .................................. 156/154; 52/309.3; 52/309.13; 52/388; 52/390; 144/346; 144/348; 144/350; 144/364; 156/249; 156/255; 156/264; 156/265; 156/267; 156/280; 156/281; 156/299; 156/304.6; 156/305; 156/331.3; 428/44; 428/50; 428/58; 428/60; 428/247
[58] Field of Search ............... 156/299, 265, 154, 267, 156/249, 280, 255, 281, 264, 305, 304.6, 331.3; 428/44, 58, 50, 60, 247; 83/39, 42; 144/346, 350, 348, 364; 264/346; 52/309.13, 309.3, 388, 311, 390

[56] References Cited

U.S. PATENT DOCUMENTS

| | | | |
|---|---|---|---|
| 53,610 | 4/1866 | Hanvey | 144/364 |
| 1,520,313 | 12/1924 | Skinner et al. | 428/50 |
| 2,070,527 | 2/1937 | Elmendorf | 428/247 |
| 2,591,771 | 4/1952 | Bergey | 156/331.3 |
| 3,279,138 | 10/1966 | Sittmar | 52/390 |
| 3,374,135 | 3/1968 | Pick | 156/265 |
| 3,579,410 | 5/1971 | Barrett | 156/299 |
| 3,908,053 | 9/1975 | Nettich | 428/58 |
| 4,047,344 | 9/1977 | Postman et al. | 52/390 |

FOREIGN PATENT DOCUMENTS

| | | | |
|---|---|---|---|
| 760223 | 10/1956 | United Kingdom | 156/299 |
| 769263 | 3/1957 | United Kingdom | 52/390 |
| 794233 | 4/1958 | United Kingdom | 52/390 |

*Primary Examiner*—John J. Gallagher
*Attorney, Agent, or Firm*—Ladas & Parry

[57] ABSTRACT

A wooden tile which is preferably used for floor covering is formed by a number of individual members which are bonded together. The wooden tile is made by knife cutting a sheet of wood from a substantially stressless piece of timber and then cutting the individual members from the wooden sheet. Adhesive such as ureaformaldehyde is applied to the edges of the members to bond them together. Alternatively, the individual members are adhesively bonded onto a mesh and some adhesive seeps between the edges of the members. The tile so formed is flexible, durable and economic to manufacture.

33 Claims, 5 Drawing Figures

WOODEN TILE AND A METHOD OF MAKING THE SAME

RELATED APPLICATIONS

This application is a continuation-in-part application to my pending application Ser. No. 663,819 which was filed on Oct. 22, 1984 and which, in turn, was filed as a continuation application to my application Ser. No. 315,083 filed on Oct. 26, 1981, now abandoned.

BACKGROUND OF INVENTION

This invention relates to wooden tiles and a method of making such a wooden tiles.

Wooden tiles have long been utilized as a covering material, particularly for floors. For many years, good quality logs were plentiful and during manufacture the wastage of wood was considerable whilst the tiles were unnecessarily thick. Depletion of lumber reserves has made logs more scarce and consequently expensive. In order to compensate for these problems the thickness of floor tiles in general has been reduced and the thickness of presently manufactured floor tiles is about 6 to 7 mm. A thinner tile has not been available simply because it has been uneconomic to manufacture the tiles by conventional methods.

It has been proposed to make floor tiles thinner than 6 mm by bonding a veneer of 1 to 2 mm thick on to an inexpensive wooden backing such as plywood or chipboard of a thickness of at least 1.5 mm to produce a laminated wooden tile. Whilst this method achieves a slightly reduced cost, the tile quality is substantially decreased and the service life is relatively short. In another attempt to reduce tile thickness, a tile has been manufactured with a top layer consisting of a thin veneer of 1 mm or under which is glued onto a substrate having a clear plastic lining on top of it. However, this method is expensive and the tile so produced does not have the natural warmth which is inherent in a natural wooden tile.

Another prior art method involves sawing a sheet of wood from a piece of lumber. The sheet of wood is then cut into a plurality of individual rectangular shaped blocks to which glue is applied along their edges. The blocks are then butted together side-by-side in any selected pattern and bonded together. The disadvantages of such a method are that it is generally not practical to manufacture the sheet of wood to a thickness of less than 6.2 mm, a considerable amount of wood is wasted in the form of sawdust by the saw cutting operation and a low yield results from the geometric differences in round logs and the straight saw cut line required for obtaining the sheet thickness.

Furthermore, the cutting of the wood with a saw results in a closed grain surface on both the top and bottom major surfaces of the cut sheet resulting in the finished tile having a rigid construction, substantially no flexibility and being brittle.

SUMMARY OF THE INVENTION

It is an object of this invention to provide a wooden tile which is flexible throughout and in which these disadvantages are substantially overcome.

It is a further object of the present invention to provide a method of manufacturing a more flexible and durable wooden tile.

According to the present invention there is provided a method of making a flexible wooden tile comprising the steps of subjecting a piece of timber to a stress relieving process to relieve stresses in the timber, knife cutting a stress relieved sheet of wood of a predetermined thickness from the piece of timber, cutting the sheet of wood into a plurality of members each having substantially parallel major planar surfaces and peripheral edge surfaces, positioning a plurality of said members into a single layer tile with an edge surface of one member substantially abutting an edge surface of another member so that said major planar surfaces of said members lie substantially in a single plane, and bonding said members together by means of an adhesive to produce a flexible wooden tile in which said wooden members are flexible and the adhesive bonds between said members are rigid.

The members may be bonded together by adhesive applied to the sides thereof prior to assembly into said tile. Alternatively, the members may be bonded onto a mesh.

Accordingly, one embodiment of the invention provides a method of making a flexible wooden tile comprising the steps of subjecting a piece of timber to a stress relieving process, knife cutting a stress relieved sheet of wood of a predetermined thickness from the piece of timber, cutting the sheet of wood into a plurality of members each having substantially parallel major planar surfaces and peripheral edge surfaces, applying a rigid setting adhesive to said side edge surfaces of the members, positioning a plurality of said members into a single layer tile with a side edge surface of one member substantially abutting a side edge surface of another member so that the adhesive is disposed between the side edge surfaces and the major planar surfaces lie substantially in a single plane, and allowing the adhesive to set to bond said members together, whereby a flexible wooden tile is produced in which the wooden members are flexible and the adhesive bonds between said members are rigid.

A further embodiment of the invention provides a method of making a flexible wooden tile comprising the steps of subjecting a piece of timber to a stress relieving process, knife cutting a stress relieved sheet of wood of a predetermined thickness from the piece of timber, cutting the sheet of wood into a plurality of members each having substantially parallel upper and lower planar surfaces and peripheral edge surfaces, positioning a plurality of said members into a single layer assembly with a side edge surface of one member substantially abutting a side edge surface of another member and with the lower planar surfaces of the members lying in a single plane and arranged uppermost, and adhesively bonding a mesh to said uppermost lower planar surfaces of the members while permitting some adhesive to seep downwardly between said substantially abutting side edge surfaces to produce a flexible wooden tile in which said wooden members are flexible and the bonds between said members are rigid.

According to a further aspect of the invention there is provided a flexible wooden tile including a plurality of stress relieved members each having substantially parallel major planar surfaces and peripheral edge surfaces and each being obtained from a sheet of wood that is knife cut from a piece of timber which has been subjected to a stress relieving process, said members being adhesively bonded together in a single layer with an edge surface of one member substantially abutting an edge surface of another member and with the major planar surfaces lying in common planes to form a flexible wooden tile in which said wooden members are flexible and the bonds between the members are rigid.

In one preferred embodiment of the invention, the tile is made from teak and may be of a thickness in the range of 1.5 to 10 mm. Preferably, the thickness of the tile is 2.5 mm.

Preferably, the members are formed of a predetermined length and breadth and the length is longer than the breadth to provide finger strips. The members are bonded together with a rigid setting adhesive such as ureaformaldehyde. The shape of the tile so formed is preferably square, although rectangular and six sided tiles may also be formed.

The invention appreciates both the need to remove stress from the block or source of wood from which the finger strips are removed and the advantage of effecting such removal by knife cutting rather than by sawing.

The removal of stress is brought about by heating and cooling, in the preferred embodiment by multiple boiling. Upon treating a high density and interlocking grain wood the natural texture in the wood expands to its maximum. The hot wood is allowed to cooled in order to let the expanded texture return to its natural position. When this is accomplished the maximum expansion becomes somewhat natural. The wood is then quick heated so that the interlocking grains release their stresses. Such multiple boiling has the two-fold advantage of making the block of source of wood easier to work with and of removing internal stress therefrom as aforesaid. While prior art methods have utilized heat treatment to some extent, it was always kept to a minimum in order to avoid discoloration of the end product. The multiple treatment of the invention is able to ignore the effect of discoloration since in a parquet-type tile mismatch of color in the component strips has an overall pleasing aesthetic effect. The additional benefit of stress removal is particularly advantageous since it vastly contributes to stability of the finished tile.

The removal of a sheet of wood from the block or source by knife cutting has several advantages. Firstly, if instead of cutting the sheet were sawn from the block or source there would be substantial wastage of material due to the fact that a saw is a toothed tool and generates wasted sawdust as it cuts a swath through the block. Secondly, utilization of a knife edge causes at least one face of the cut sheet to have an open grain structure. This, in turn, substantially contributes to the very necessary flexibility of the cut piece. The component fingers in the tile of the invention are responsible for the overall flexibility of the tile. This desired flexibility arises both from the thinness of the tile and from the openness of the grain made possible by knife cutting. As will be described with specific reference to the drawings, the bonding between adjacent fingers in a block of fingers and between adjacent blocks of fingers is rigid and it is the resilient fingers themselves which render the tile resilient or flexible.

If the glue joints were not rigid, flexibility would be imported by an outside force and would not be due to the flexibility of the fingers. For the fingers themselves to impart the flexibility to the finished tile, it is essential to be able to transmit force from one finger to an adjacent finger. This cannot be done without a rigid joint between the adjacent fingers. In fact, the rigidity of the bond is greater than the flexibility of the fingers. Prior art assemblies have sought to impart flexibility to such tiles either by having less than rigid joints between fingers and blocks or by cutting one or more grooves in the underside of the tiles. The presence of such grooves has an obvious weakening effect.

Far from being weakened, the tile of the invention is a unitized structure whose flexibility and resilience not only gives rise to durability but also enables the tile to be securely mounted on a surface which is not totally even.

Although the tile described in detail in this specification and illustrated in the drawings is intended primarily as a floor tile, it will be appreciated that the tile could also be a wall tile, ceiling tile or any other form of decorative tile.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
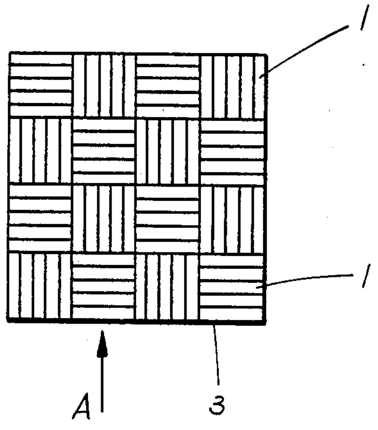
FIG. 1 is a plan view of one embodiment of a wooden tile of the invention.
Figure 2:
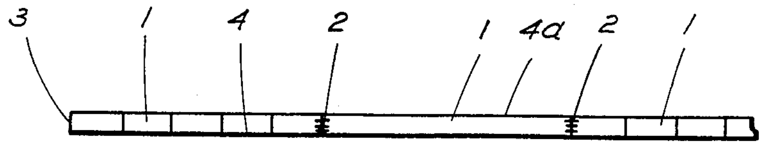
FIG. 2 is a partial side view of the wooden tile in the direction of the Arrow A in FIG. 1.

Referring now more particularly to the wooden tile illustrated in FIGS. 1 and 2, the tile is a parquet tile which is square and is assembled from a plurality of independent solid wood fingers 1 which are bonded together along abutting edges with a suitable adhesive such as ureaformaldehyde. The essential features of the strength of the bond and the flexibility of the fingers will be described hereinafter.

The fingers 1 are formed into blocks of five parallel fingers laid side-by-side and the parquet tile shown comprises sixteen such blocks laid so that the longitudinal fingers of each block lie at right angles to those of the next adjacent block.

FIG. 2 illustrates a partial side view of the tile in the direction of arrow A of FIG. 1 and further illustrates the bonded joints 2 between the blocks of fingers 1. Although not shown in FIG. 2 for the sake of clarity, the individual fingers of each block are similarly butted and bonded together.

The process by which the wooden tile disclosed above is manufactured will now be described in detail with particular reference to making the tile from teak.

The first step is to prepare or treat a log of teak. Such preparation or treatment serves two purposes. Firstly, the wood is softened which facilitates the removal of relative thin sheets from which the fingers 1 are subsequently cut. Secondly, the treatment removes stress from the wood and thereby results in the production of stable but flexible fingers. This removal of stress is an essential feature of the invention.

To this end, a teak log is boiled or steamed and then allowed to cool to ambient temperature whereupon its temperature is quickly raised again by boiling or steaming for a second time. The aim is both to heat and to wet the log and this can be achieved either by boiling or by steaming.

As the teak log begins to cool after the second boiling the log is placed in a rotary lathe such as is manufactured by Capital Corporation in the United States of America. While the log is still not hot but cooled sufficiently to allow efficient cutting of the wood, the log is rotated and a sheet of wood of a thickness of a little more than 2.5 mm is cut by a knife from the surface of the log. Instead of stabilizing the log by multiple heat treatment, other methods of stabilization, such as chemical impregnation, may be utilized.

Figure 5:
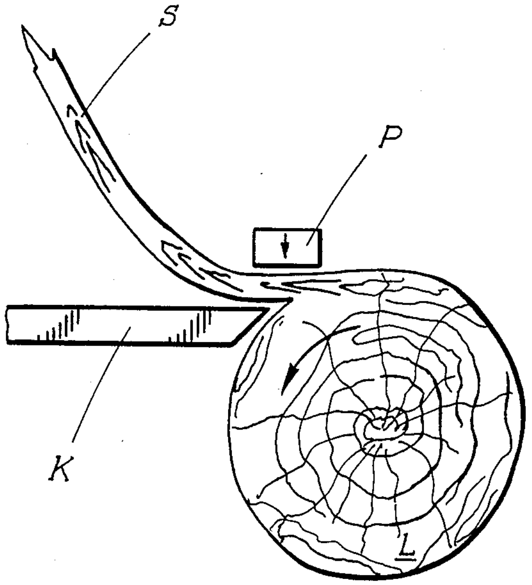

FIG. 5 schematically shows such a lathe type operation in which a log L is rotated counterclockwise while a knife edge K is advanced substantially longitudinally to the rotating log to remove a sheet of wood S. A pressure bar P cooperates with the knife edge. With such an arrangement, the sheet will curve away from the knife around the pressure bar and the face of the sheet in contact with the pressure bar will have a closed grain structure and the opposite face of the sheet on the side of the knife edge will have an open grain structure. The knife blade is some 4 feet in length and is positioned at an angle which will provide the maximum smooth cut as the sheet is removed.

In the present embodiment, the sheets peeled from the log are cut by means of a saw into a plurality of elongate rectangular fingers although, alternatively, a knife can be used. The fingers are then stacked with their respective edge surfaces in common planes so that adhesive such as ureaformaldehyde can be applied to the edge surfaces.

The fingers are then laid in a jig (not shown) in the pattern shown in FIG. 1 with surfaces of the jig supporting the outer peripheral surface 3 of the tile in FIG. 1. The jig is then removed and the tile placed between platens of a hot press with other similarly formed tiles. The platens apply pressure on the lower 4 and upper **4*a*** surfaces of the tiles and the hot press is operated to apply a pressure of preferably 10 metric tons per square foot to the tile for some three minutes. When the pressure is released the adhesive is cured and the fingers of the tile bonded together.

This hot curing is best achieved by laying the assembled tiles on a thin sheet of heat conductive material such as, for example, aluminum. In this manner heat from the press will pass through the conductive sheet and will be uniformly distributed for application to the tiles.

Alternatively, bonding can be accomplished by cold curing in which case an unheated press is utilized and pressure is applied thereby for a longer period of time.

When the adhesive has cured, the tile is trimmed around its edges to define a square tile with each of the sides having a length of 305 mm. The main major upper and lower surfaces of the tile are finished in a conventional manner to provide commercially acceptable surfaces. After this finishing process, the tile has a thickness of some 2.5 mm and does not have a backing substrate.

To obtain good results a special sanding technique is employed. A special sanding machine is used to sand tile surfaces so that the center is slightly thicker than the sides by about 0.05 mm. This configuration is more stable than with a perfectly flat or thin in the center tile and reduces cupping or dishing of the tile during storage before installation.

Further stability is achieved by surface treatment with a high penetrating primer. The primer penetrates the face filling in the gaps or pores in the open grain structure and holds any natural loose fibers in the fingers together. After application of such a primer, the face of the tile is sanded by a circular motion fine sanding machine using very fine sand paper.

Figure 3:
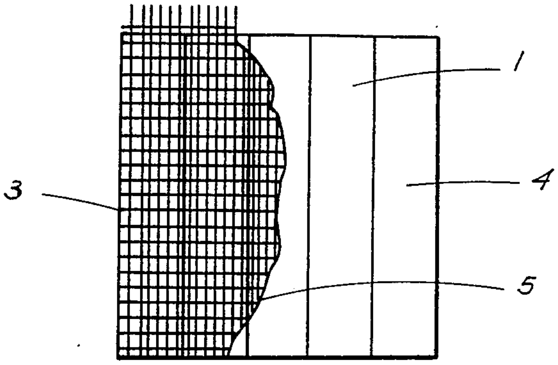
FIG. 3 is a plan view of part of a further embodiment of a tile.

In an alternative embodiment of manufacturing a wooden tile of the invention the individual fingers can be formed in an identical manner to that described above with reference to the embodiment of FIGS. 1 and 2. However, in this alternative embodiment the fingers 1, only five of which are shown in FIG. 3, are placed in a jig (not shown) in a desired pattern with the lower major surface 4 arranged uppermost and then adhesive is applied to said uppermost lower major surface. A cotton mesh 5 of which only a portion is shown is then laid on the surface 4, the adhesive is cured by infrared light and the tile is removed from the jig. The major surface **4*a* without the glue and mesh is the face of the tile. In the finished tile the mesh 5 extends substantially over the whole of the lower major surface 4** of the tile. Although in this embodiment no adhesive is actually applied to the sides of the fingers, nevertheless some adhesive will seep downwardly from the layer applied to the uppermost lower surface and will enter between the juxtaposed fingers. This so called "inverted glueing" is particularly advantageous when bonding thin finger components together.

Alternatively, the cotton mesh may be soaked with wet glue and be applied to the bare wooden surface of the lower major surface of the tile. Again some adhesive will seep or creep from the glue impregnated mesh and will enter between the fingers. The cotton mesh is 0.3 mm in thickness.

Although cotton mesh has been described with reference to the present embodiment, mesh of any other material can be used.

The wooden tiles of the invention have flexibility throughout and this flexibility results from the flexibility of the fingers. It has been explained in the preceeding paragraphs how the removal of stress from the wood imparts flexibility to the fingers. The glue joints 2 between adjacent fingers 1 and between adjacent blocks of fingers are rigid. With these joints rigid it will be appreciated that flexibility of the composite tile can only come from flexibility of the constituent finger components. In fact, the bonding with rigid adhesive between all joints serves to multiply the flexibility of each flexible finger. In this manner, the composite tile can better mate with an uneven base surface on which the tile is mounted.

The advantages gained by the method of manufacturing the tile of the invention is that by cutting the wooden sheet from the log with a knife not only is lumber wastage minimized but also, as already described with reference to FIG. 5, an open grain surface is provided on one side and a closed grain surface is provided on the other side of the wooden sheet. However, while in the finished tile it does not matter where the open grain occurs, the tile has a flexibility which is hitherto unknown in wooden floor tiles. Furthermore, the method provides for a thinner solid wooden tile than that previously manufactured, the thinness also resulting in a tile which is both light in weight and economical to produce.

The following specific example illustrates the production of wood tiles from teak.

Teak logs are cut to bolts of about 1000 mm in length and heated to a temperature of slightly below the boiling point of water. Small bolts require about 12 to 24 hours while large bolts require as long as 48 to 72 hours. The bolts are allowed to cool to room temperature whereupon they are again re-heated to a temperature of slightly below the boiling point of water. Upon cooling, but while still warm, the bolts of wood are cut by a full round rotary lathe to a thickness of 2.5 mm to make stable sheets. The sheets are dried by a roller type jet dryer with a cooling section to bring the moisture content to about 5% to 8%. (Heat-and-pressure press drying is also recommended).

The sheet is cut lengthwise into strips of 25 mm width. The strips are cross cut to 50 and 100 mm lengths.

A rigid adhesive, for example a ureaformaldehyde mix is coated on all four sides of eight 50 mm and thirty-two 100 mm fingers which are then assembled to form a tile on a non glue adhering spacing sheet in a jig. The operator works the jig by slightly pushing and jamming actions to arrange the fingers surrounded by wet ureaformaldehyde mix. The jig is opened and the tile and spacing sheet are removed together and with the tile still stacked on the spacing sheet are placed in a press. While the ureaformaldehyde mix is wet and un-cured, a top pressure of under 5 tons/ft$^2$ is applied for about 10 minutes then increased to about 10 tons/ft$^2$ and kept constant for approximately two hours until the ureaformaldehyde mix is set. The tiles are removed and the spacing sheets are kept for re-use.

The sliding and jamming actions of the jig push all fingers toward each other in all four sides bringing all of them to their nearest possible position. The excess wet ureaformaldehyde mix is squeezed out on top and bottom. When the assembled tile is removed from the jig, the fingers have the freedom still slightly to move to find their most natural position with the least stress and strain.

When the first top pressure of under 5 tons/ft$^2$ is applied it aligns the height of each finger and also flattens those not perfectly flat. Under this pressure and with the ureaformaldehyde mix still unset and un-cured, the fingers are still able further to rearrange themselves slightly to gain a new and final stable position in which the entire tile has least stress and strain prior to curing of ureaformaldehyde mix. At this point the constant pressure of about 10 tons/ft$^2$ is applied. Under this final pressure the fingers are held in position without moving, and the ureaformaldehyde mix cold cures and bonds all fingers rigidly to make one unit tile.

Although the method of the invention is not restricted to the use of an adhesive of a ureaformaldehyde mix and it is possible to use any kind of rigid adhesive, all cold cure, heat cure, and high frequency cure ureaformaldehydes may be used effectively. A typical cold cure ureaformaldehyde mix for use in the hot season in Bangkok includes 100 gms of liquid ureaformaldehyde (50% to 55% non volatile content), 500 gms of extender (filler-e.g. flour or fine wood dust), 50 gms of coloring agent as necessary to match the wood to be glued and an appropriate hardener.

The roughness of wood and the dried excessive ureaformaldehyde on the major surfaces contribute to a condition which may result in warpage. By means of abrasive planing both major surfaces are dressed, the roughness and excessive ureaformaldehyde are removed and the tile is smooth and of even thickness.

The invention has been described with reference to two particular embodiments. However, a number of modifications may be made to the method without departing from the scope of the invention.

While the sheet of wood has been described as being cut from a teak log on a rotary lathe, it is to be understood that such sheets may be removed from a bolt of wood by means of so called horizontal, vertical, slanted or lengthways slicers which are well known in the art, but in which the sheets are essentially removed by cutting with a knife. A typical such slicing machine is produced by the Italian firm of Cremona Angelo. Furthermore, while the knife has been described as being some 4 feet in length, it may be of any convenient greater or lesser length and may, for example, be up to some 16 feet in length. In the so-called lengthways slicer the blade may be only 10 inches long.

Other woods may be used in making such tiles but it is not necessary to subject all of them to the boiling or steaming process described. However, it is necessary to ensure that there is minimal or no stress in the wood from which the sheet is taken and that said sheet be taken from the log or bolt by cutting with a knife.

Figure 4:
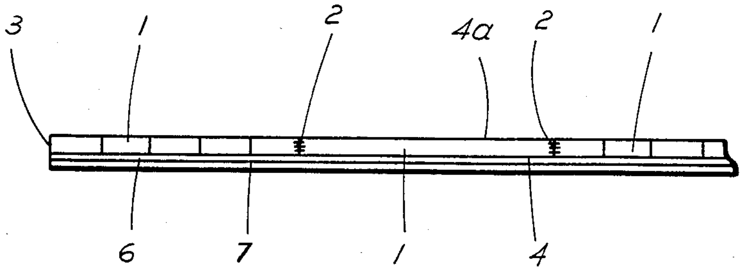
FIG. 4 is a partial side view of part of a still further embodiment of a tile, and FIG. 5 schematically shows the removal of a sheet of wood from a log.

In the modified form of tile shown in FIG. 4, the finished tile in which the fingers 1 are bonded to each other by adhesive on abutting sides is coated on its lower major surface 4 with a self adhesive 6. This self adhesive is sticking on both sides. One side sticks to the lower major surface 4 and the reverse side is intended to stick to the floor or other surface on which the tile is mounted. A removable layer or sheet 7 of non-adhesive release material covers said reverse side during storage and shipping and is removed immediately prior to mounting the tile. While this modification is shown added to a tile of the type shown in FIG. 2 of the drawings, it will be appreciated that it could equally be added to a tile of the type shown in FIG. 3. In fact, the self adhesive layer may be applied to any of the tile forms covered by this invention and may be a double sided adhesive tape with outer non-adhesive release material.

In another modified form of the invention the bonded tile of the embodiment of FIGS. 1 and 2 has a mesh of any of the types referred to above bonded to its lower major surface.

The tile of the invention, consisting of single unit in unitized structure, having no loosely held or free play fingers can competitively and economically be upgraded by treating with liquid resin to improve the natural physical characteristics. It is particularly advantageous for the tile made from a low density, abundant, and low priced wood to be upgraded by this means as such an upgraded tile is especially suitable for use as a floor tile.

To this end, a tile made from rubber wood is put in a vacuum chamber. A polyurethane liquid is introduced and allowed to penetrate the tile until saturated. The tile is removed and allowed to cure. After curing it is durable and capable of withstanding such use as flooring material. Maintenance is easy and requires practically no refinishing which is a desirable feature of wood floor tile.

Other liquid resins such as polyester, phenolic, malamine and the like can be used. A suitable curing method including heat, pressure, high frequency, chemical and catalystic reactions or radiation (by means of electron bombardment) is selected depending upon the resins used, species of wood, and conditions of the treatment.

The shape of the tile is not restricted to a square tile but may be of any shape such as an elongate rectangular form or a six sided form for example. Furthermore, the pattern on the tile formed by the positioning of the fingers can be varied as desired and the fingers can be of different lengths to accommodate alternative patterns.

While the embodiments of the wooden tile have been disclosed with reference to teak, wood selected from oak, rare wood species and other types of wooden materials can be used.

I claim:

1. A method of making a flexible wooden tile consisting essentially of the steps of subjecting a piece of timber to a stress relieving process to relieve stresses in the timber, knife cutting a stress relieved sheet of wood of a predetermined thickness from the piece of timber, cutting the sheet of wood into a plurality of members each having substantially parallel major planar surfaces and peripheral edge surfaces, positioning a plurality of said members into a single layer tile with an edge surface of one member substantially abutting an edge surface of another member so that said major planar surfaces of said members lie substantially in a single plane, and bonding said members together by means of an adhesive applied to the peripheral edge surfaces before said members are assembled to produce a flexible wooden tile in which said wooden members are flexible and the adhesive bonds between said members are rigid.

2. A method as claimed in claim 1, wherein the knife cutting of the sheet of wood from the piece of timber is effected using a rotary lathe.

3. A method as claimed in claim 1, wherein the knife cutting of the sheet of wood from the piece of timber is effected using a slicing machine.

4. A method as claimed in claim 1, wherein stress relieving of the timber is effected by boiling said timber, cooling the timber to ambient temperature and then boiling the timber again.

5. A method as claimed in claim 1, wherein the members cut from the sheet of wood are in the form of elongated rectangular finger elements.

6. A method as claimed in claim 5, wherein the plurality of finger elements are positioned side by side to form a block and a plurality of such blocks are positioned side by side to form the tile.

7. A method as claimed in claim 6, wherein the members and blocks together define a square tile.

8. A method as claimed in claim 1, wherein a self-adhesive is applied to the undersurface of the tile.

9. A method as claimed in claim 8, wherein the self-adhesive is a double sided self-adhesive tape applied to the undersurface of the tile.

10. A method as claimed in claim 1, wherein the plurality of members are positioned into a single layer in a jig.

11. A method as claimed in claim 10, wherein the members are positioned in the jig on a heat conductive sheet.

12. A method as claimed in claim 1, wherein the members are bonded together upon curing of the adhesive in a press.

13. A method as claimed in claim 12, wherein the press is a hot press.

14. A method a claimed in claim 12, wherein in the press is a cold press.

15. A method as claimed in claim 12, wherein the press applies an initial pressure of less than 5 tons/ft$^2$ and subsequently applies an increased pressure of about 10 tons/ft$^2$.

16. A method as claimed in claim 1, wherein the tile is sanded to a thickness of approximately 2.5 mm.

17. A method as claimed in claim 1, wherein the tile is sanded to present a central region which is thicker than the side regions by about 0.05 mm.

18. A method as claimed in claim 1, wherein the wooden tile is formed of wood selected from teak, oak and rare wood species.

19. A method as claimed in claim 1, wherein the adhesive is ureaformaldehyde.

20. A method as claimed in claim 1, wherein the flexible wooden tile produced is impregnated with a preserving material.

21. A method of making a flexible wooden tile consisting essentially of the steps of subjecting a piece of timber to a stress relieving process, knife cutting a stress relieved sheet of wood of a predetermined thickness from the piece of timber, cutting the sheet of wood into a plurality of members each having substantially parallel major planar surfaces and peripheral edge surfaces, applying a rigid setting adhesive to said side edge surfaces of the members, positioning a plurality of said members into a single layer tile with a side edge surface of one member substantially abutting a side edge surface of another member so that the adhesive is disposed between the side edge surfaces and the major planar surfaces lie substantially in a single plane, and allowing the adhesive to set to bond said members together, whereby a flexible wooden tile is produced in which the wooden members are flexible and the adhesive bonds between said members are rigid.

22. A flexible wooden tile consisting essentially of a plurality of stress relieved members each having substantially parallel major planar surfaces and peripheral edge surfaces and each being obtained from a sheet of wood that is knife cut from a piece of timber which has been subjected to a stress relieving process, said members being adhesively bonded together by adhesive between the peripheral edge surfaces in a single layer with an edge surface of one member substantially abutting an edge surface of another member and with the major planar surfaces lying in common planes to form a flexible wooden tile in which said wooden members are flexible and the bonds between the members are rigid.

23. A tile as claimed in claim 22, wherein the members are in the form of elongated rectangular elements.

24. A tile as claimed in claim 23, wherein the plurality of elements are positioned side by side to form a block and a plurality of such blocks are positioned side by side to form the tile.

25. A tile as claimed in claim 24, wherein the members and blocks together define a square tile.

26. A tile as claimed in claim 22, wherein a self-adhesive is applied to the undersurface of the tile.

27. A tile as claimed in claim 26, wherein the self-adhesive is a double sided self-adhesive tape having a first surface applied to the undersurface of the tile and an exposed surface directed away therefrom.

28. A tile as claimed in claim 22, wherein a removable protective covering extends over the exposed surface of the self-adhesive tape.

29. A tile as claimed in claim 22, wherein the tile is sanded to a thickness of approximately 2.5 mm.

30. A tile as claimed in claim 22, wherein the tile is sanded to present a central region which is thicker than the side regions by about 0.05 mm.

31. A tile as claimed in claim 22, wherein the wooden tile is formed of wood selected from teak, oak and rare wood surfaces.

32. A tile as claimed in claim 22, wherein the adhesive is ureaformaldehyde.

33. A tile as claimed in claim 22, wherein the flexible wooden tile produced is impregnated with a preserving material.

* * * * *